(12) United States Patent
Kim

(10) Patent No.: US 12,139,192 B2
(45) Date of Patent: Nov. 12, 2024

(54) APPARATUS AND METHOD FOR DIAGNOSING MALFUNCTIONS OF STEERING ANGLE SENSORS

(71) Applicant: HYUNDAI MOBIS CO., LTD., Seoul (KR)

(72) Inventor: Dong Hee Kim, Yongin-si (KR)

(73) Assignee: HYUNDAI MOBIS CO., LTD., Seoul (KR)

(*) Notice: Subject to any disclaimer, the term of this patent is extended or adjusted under 35 U.S.C. 154(b) by 160 days.

(21) Appl. No.: 17/820,817

(22) Filed: Aug. 18, 2022

(65) Prior Publication Data

US 2023/0391400 A1    Dec. 7, 2023

(30) Foreign Application Priority Data

Jun. 7, 2022    (KR) .................. 10-2022-0068668

(51) Int. Cl.
    B62D 15/02    (2006.01)
(52) U.S. Cl.
    CPC ..... B62D 15/0215 (2013.01); B62D 15/0245 (2013.01)
(58) Field of Classification Search
    CPC .............. B62D 15/0215; B62D 15/0245; B62D 5/049; G01D 3/08; G01D 5/145; G01D 5/24461; G01D 2205/28; G01B 21/22

See application file for complete search history.

(56) References Cited

U.S. PATENT DOCUMENTS

| 6,862,551 | B1 | 3/2005 | Kang et al. |
| 9,097,559 | B2* | 8/2015 | Ronnat ............... G01D 5/2458 |
| 9,310,195 | B2* | 4/2016 | Stafford ................ G01D 5/04 |
| 2005/0171727 | A1* | 8/2005 | Sakabe .................. G01D 5/04 |
| | | | 180/444 |
| 2008/0307873 | A1* | 12/2008 | Kang ..................... G01D 5/145 |
| | | | 73/117.02 |

FOREIGN PATENT DOCUMENTS

| DE | 195 06 938 | 8/1996 |
| DE | 10 2010 053 596 | 6/2012 |
| DE | 102010053596 A1 * | 6/2012 ............ G01D 5/145 |

(Continued)

OTHER PUBLICATIONS

English Language Abstract of KR 2021-0113758 published Sep. 17, 2021.

(Continued)

*Primary Examiner* — Akm Zakaria
(74) *Attorney, Agent, or Firm* — DLA Piper LLP US

(57) ABSTRACT

An apparatus for diagnosing malfunction of a steering angle sensor. A steering angle sensor includes a main gear mounted on a steering shaft, first and second sub-gears meshed with the main gear at a specific gear ratio different from that of the main gear, and position sensors attached to the first and second sub-gears, respectively. A processor receives a signal output with rotation of the corresponding sub-gear from each of the position sensors of the steering angle sensor, detects at least one of the two position sensors which outputs different output signal values that are not designated in correspondence with a value of the same system angle, and determines the detected at least one position sensor as a cause of a malfunction.

8 Claims, 5 Drawing Sheets

(56) References Cited

FOREIGN PATENT DOCUMENTS

| | | |
|---|---|---|
| DE | 10 2020 100 904 | 7/2020 |
| JP | 2012-88116 | 5/2012 |
| KR | 2021-0113758 | 9/2021 |

OTHER PUBLICATIONS

German Office Action dated Jan. 18, 2023 issued in German Application No. 10 2022 119 366.7.
English Language Abstract of DE 10 2010 053 596 published Jun. 14, 2012.
English Language Abstract of JP 2012-88116 published May 10, 2012.
English Language Abstract of DE 195 06 938 published Aug. 29, 1996.
English Language Abstract of DE 10 2020 100 904 published Jul. 23, 2020.
Korean Notice of Allowance dated Apr. 23, 2024 issued in Korean Application Serial No. 1-2022-0068668.

\* cited by examiner

APPARATUS AND METHOD FOR DIAGNOSING MALFUNCTIONS OF STEERING ANGLE SENSORS

CROSS-REFERENCE TO RELATED APPLICATION

This application claims priority from and the benefit of Korean Patent Application No. 10-2022-0068668, filed on Jun. 7, 2022, which is hereby incorporated by reference for all purposes as if set forth herein.

BACKGROUND

Field

Exemplary embodiments of the present disclosure relate to an apparatus and method for diagnosing malfunctions of steering angle sensors, and more particularly, to an apparatus and method for diagnosing malfunctions of steering angle sensors, configured to be able to diagnose a malfunction of a position sensor included in the steering angle sensors that detect a steering angle of a steering wheel provided for a vehicle.

Discussion of the Background

In general, an electric steering system applied to a vehicle may include a steering angle sensor installed on a steering shaft transmitting manipulating force in connection with a steering wheel manipulated by a driver and detecting a rotation angle, i.e., a steering angle, of the steering wheel.

As illustrated in FIG. 1, the steering angle sensor includes a main gear MG mounted on the steering shaft, first and second sub-gears SG1 and SG2 meshed with the main gear MG with constant gear ratios (i.e., with different gear ratios) to the main gear MG, and position sensors PS1 and PS2 attached to the first and second sub-gears SG1 and SG2 respectively.

Outputs (i.e., signals) of the first and second position sensors PS1 and PS2 of the steering angle sensor are output to an electronic control unit (ECU) of the electric steering system. The first position sensor PS1 outputs a rotation angle of the first sub-gear SG1, and the second position sensor PS2 outputs a rotation angle of the second sub-gear SG2.

The rotation angle (i.e., the steering angle) of the steering shaft can be determined from the rotation angle of the first sub-gear SG1 and the rotation angle of the second sub-gear SG2.

The Background Art of the present disclosure was disclosed in Korean Patent Application Publication No. 10-2021-0113758 (published on Sep. 17, 2021, and entitled "Apparatus for Detecting Malfunctions of Steering Angle Sensors and Method of Controlling Same").

The Background Art relates to a method of detecting outputting information about an incorrect angle when mesh between the main gear and each sub-gear is dislocated in a case in which teeth of the gear are lost or deformed.

However, the Background Art has a problem in which a malfunction of the steering angle sensor caused by a malfunction (e.g., a malfunction of a sensor IC) of the first position sensor PS1 or the second position sensor PS2 in a normal mesh condition without damage to the teeth of the gear may not be diagnosed.

SUMMARY

According to an aspect of the present disclosure, the present disclosure has been invented to solve the problems as described above, and is directed to providing an apparatus and method for diagnosing malfunctions of steering angle sensors, which are configured to be able to diagnose a malfunction of a position sensor included in the steering angle sensors detecting a steering angle of a steering wheel provided for a vehicle.

An apparatus for diagnosing malfunctions of steering angle sensors according to an aspect of the present disclosure includes: a steering angle sensor including a main gear (MG) mounted on a steering shaft, first and second sub-gears (SG1 and SG2) meshed with the main gear (MG) at a specific gear ratio different from that of the main gear (MG), and position sensors (PS1 and PS2) attached to the first and second sub-gears (SG1 and SG2) respectively; and a processor receiving a signal output with rotation of the corresponding sub-gear from each of the position sensors (PS1 and PS2) of the steering angle sensor, detecting the position sensor of the two position sensors (PS1 and PS2) which outputs different output signal values (y' and y") not designated in correspondence with a value of the same system angle (x'=x"), and determining the position sensor as a cause of a malfunction.

In an embodiment, the processor may receive an output signal output from each of the position sensor (PS1 and PS2), and determines the corresponding position sensor as a cause of a malfunction when an output signal value out of an error range is output by comparing the output signal values (y' and y") of the position sensors (PS1 and PS2) with values pre-stored in a table or a map form in correspondence with the value of the same system angle (x'=x").

In an embodiment, the processor may mean the position sensors (PS1 and PS2) are determined to be normal in a case in which, when drawing a virtual horizontal line at any one value of a longitudinal axis representing normal duty ranges of the sub-gears (SG1 and SG2) or rotation angles of the sub-gears, and when drawing a virtual vertical line on the basis of an intersection (y') at which the virtual horizontal line and the signal of the position sensor (PS1) meet with each other, a value (x") of the system angle corresponding to an intersection (y") at which the virtual vertical line and the signal of the position sensor (PS2) meet with each other and a value (x') of the system angle corresponding to an intersection (y') at which the virtual vertical line and the signal of the position sensor (PS1) meet with each other are the same value (x'=x") within a designated error range, and when the virtual horizontal line and the signal of the position sensor (PS1) are all detected normally at all intersections (y').

In an embodiment, the processor may determine the position sensors (PS1 and PS2) to be normal in a case in which a value (x') of the system angle corresponding to an intersection (y') at which the virtual vertical line and the signal of the position sensor (PS1) meet with each other and a value (x") of the system angle corresponding to an intersection (y") at which the virtual vertical line and the signal of the position sensor (PS2) meet with each other are the same value (x'=x") within a designated error range when drawing a virtual horizontal line at any one value of a longitudinal axis representing normal duty ranges of the sub-gears (SG1 and SG2) or rotation angles of the sub-gears, and when drawing a virtual vertical line on the basis of an intersection (y') at which the virtual horizontal line and the signal of the position sensor (PS1) meet with each other, and in a case in which the virtual horizontal line and the signal of the position sensor (PS2) are all detected normally at all intersections (y").

In an embodiment, the processor may determine at least one of the position sensors (PS1 and PS2) to be abnormal when the value of the system angle corresponding to the intersection is not detected as the same value (x'=x") even once within a designated error range In an embodiment, the processor may determine a malfunction of the position sensor when the output signal values (y' and y") of the position sensors (PS1 and PS2) which correspond to the same specific system angles (x' and x") using Math Formulae 1 and 2 below are calculated, and when the output signal values (y' and y") of the position sensors (PS1 and PS2) are out of a designated error range in correspondence with the same two system angles (x' and x").

$$x'=y'/a+b*i \quad \text{(Formula 1)}$$

a is a value calculated as a gear ratio of a first position sensor (PS1) against a system angle, as the number of times of repetition which the same output signal value (y') can be detected within a system angle, b is a value calculated by "system angle/a", as a system angle interval (difference) at which an output value of the first position sensor (PS1) is equally repeated, and i is a value of a constant smaller than a from zero (0).

$$x''=y''/c+d*j \quad \text{(Formula 2)}$$

c is a value calculated as a gear ratio of a first position sensor (PS1) against a system angle, as the number of times of repetition which the same output signal value (y') can be detected within a system angle, d is a value calculated by "system angle/c", as a system angle interval (difference) at which an output value of the first position sensor (PS1) is equally repeated, and j is a value of a constant smaller than c from zero (0).

A method of diagnosing malfunctions of steering angle sensors according to an aspect of the present disclosure, which is configured to include a main gear (MG) mounted on a steering shaft, first and second sub-gears (SG1 and SG2) meshed with the main gear (MG) at a specific gear ratio different from the main gear (MG), and position sensors PS1 and PS2 attached to the first and second sub-gears (SG1 and SG2) respectively, the method including: receiving, by a processor, a signal output from each of the position sensor (PS1 and PS2) of the steering angle sensor as the corresponding sub-gear is rotated; and detecting, by the processor, the position sensor of the two position sensors PS1 and PS2, which outputs different output signal values (y' and y") that are not designated in correspondence with a value of the same system angle (x'=x"), and determining the detected position sensor as a cause of a malfunction.

In an embodiment, after receiving the output signal output from each of the position sensors PS1 and PS2, the processor determines the corresponding position sensor as a cause of a malfunction when the output signal values (y' and y") of the position sensors PS1 and PS2 are compared with a value pre-stored in a table or a map form in correspondence with a value of the same system angle (x'=x"), and the output signal value out of an error range is output.

In an embodiment, in order to determine the malfunction of the position sensor, the processor may be configured to draw a virtual horizontal line at any one value of the vertical axis presenting a normal duty range of each of the sub-gears (SG1 and SG2) or a rotation angle of each of the sub-gears, to draw a virtual vertical line on the basis of an intersection (y') at which the virtual horizontal line and the signal of the position sensor (PS1) meet with each other, a value (x") of the system angle corresponding to an intersection (y") at which the virtual vertical line and a PS2 signal meet with each other, and a value (x') of the system angle corresponding to an intersection (y') at which the virtual vertical line and a PS1 signal meet with each other are the same value (x'=x") within a designated error range, and to determine the position sensors (PS1 and PS2) to be normal when both are detected at all intersections (y') at which the virtual horizontal line and the signal of the position sensor (PS1) meet with each other.

In an embodiment, when, to determine the malfunction of the position sensor, the processor draws a virtual horizontal line at any one value of the vertical axis presenting a normal duty range of each of sub-gears (SG1 and SG2) or a rotation angle of each of the sub-gears, and draws a virtual vertical line on the basis of an intersection (y") at which the virtual horizontal line and a signal of the position sensor (PS2) meet with each other, a value (x') of the system angle corresponding to an intersection (y') at which the virtual vertical line and a signal of the position sensor (PS1) meet with each other, and a value (x") of the system angle corresponding to an intersection (y") at which the virtual vertical line and the signal of the position sensor (PS2) meet with each other, are the same value (x'=x") within a designated error range, and when both the virtual horizontal line and the signal of the position sensor (PS2) are normally detected at all the intersections (y") at which both meet with each other, the position sensors (PS1 and PS2) are determined to be normal.

In an embodiment, the processor may determine at least one of the position sensors PS1 and PS2 to be abnormal when the same value (x'=x") is not detected even once within a designated error range within which the value of the system angle corresponding to the corresponding intersection is designated.

In an embodiment, in order to determine the malfunction of the position sensor, the processor may calculate output signal values (y' and y") of the position sensors (PS1 and PS2) which correspond to the same specific system angles (x' and x") using Formula 1 and 2 below, and may determine the malfunction of the position sensor when the output signal values (y' and y") of the position sensors (PS1 and PS2) deviate from a designated error range in correspondence with the same values of the two system angles (x' and x").

$$x'=y'/a+b*i \text{(Formula 1)}$$

a is a gear ratio of a first position sensor PS1 against a system angle, as the number of times of repetition which the same output signal value (y') is detected within a system angle, b is a value calculated by "system angle/a", as a system angle interval (difference) at which an output value of the first position sensor (PS1) is equally repeated, and i is a value of a constant smaller than a from zero (0).

$$x''=y''/c+d*j \quad \text{(Formula 2)}$$

c is a value calculated as a gear ratio of a first position sensor PS1 against a system angle, as the number of times of repetition which the same output signal value (y') is detected within a system angle, d is a value calculated by "system angle/c", as a system angle interval (difference) at which an output value of the first position sensor (PS1) is equally repeated, and j is a value of a constant smaller than c from zero (0).

According to an aspect of the present disclosure, the present disclosure is configured to be able to diagnose malfunctions of position sensors included in a steering angle sensor detecting a steering angle of a steering wheel provided for a vehicle. Further, the present disclosure has an effect of detecting one of two position sensors (PS1 and PS2) which is included in the steering angle sensors and outputs a different output signal value (y) that is not designated in correspondence with values of the same system angles (x), and enabling the detected position sensor to be determined to be a malfunction.

DETAILED DESCRIPTION OF THE ILLUSTRATED EMBODIMENTS

Figure 1:
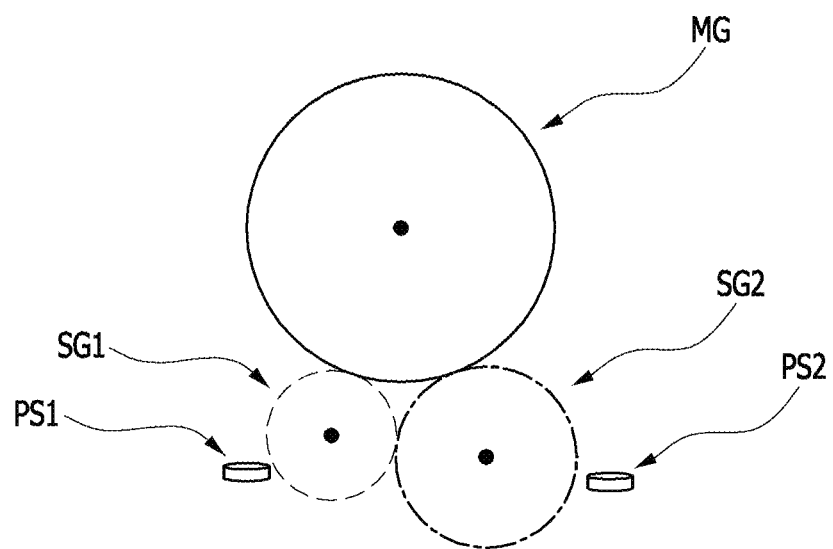
FIG. 1 is an illustrative view showing mesh between a main gear and two sub-gears, and a configuration of a position sensor in an apparatus for diagnosing malfunctions of steering angle sensors according to an embodiment of the present disclosure.

As is traditional in the corresponding field, some exemplary embodiments may be illustrated in the drawings in terms of functional blocks, units, and/or modules. Those of ordinary skill in the art will appreciate that these block, units, and/or modules are physically implemented by electronic (or optical) circuits such as logic circuits, discrete components, processors, hard-wired circuits, memory elements, wiring connections, and the like. When the blocks, units, and/or modules are implemented by processors or similar hardware, they may be programmed and controlled using software (e.g., code) to perform various functions discussed herein. Alternatively, each block, unit, and/or module may be implemented by dedicated hardware or as a combination of dedicated hardware to perform some functions and a processor (e.g., one or more programmed processors and associated circuitry) to perform other functions. Each block, unit, and/or module of some exemplary embodiments may be physically separated into two or more interacting and discrete blocks, units, and/or modules without departing from the scope of the inventive concept. Further, blocks, units, and/or module of some exemplary embodiments may be physically combined into more complex blocks, units, and/or modules without departing from the scope of the inventive concept.

Hereinafter, an apparatus and a method of diagnosing malfunctions of steering angle sensors according to the present disclosure will be described with reference to the attached drawings.

In this process, thicknesses of lines shown in the drawings and sizes of constituent elements may be exaggerated for clarity and convenience. Further, the following terms are defined, considering their functions in the present disclosure, and may be varied according to intentions and customs of a user or a manager. Thus, the terms used herein should be defined based on the contents of the entire specification.

FIG. 1 is a block diagram in which a configuration of an apparatus for controlling side-view mirrors according to an embodiment of the present disclosure is briefly illustrated.

Figure 2:
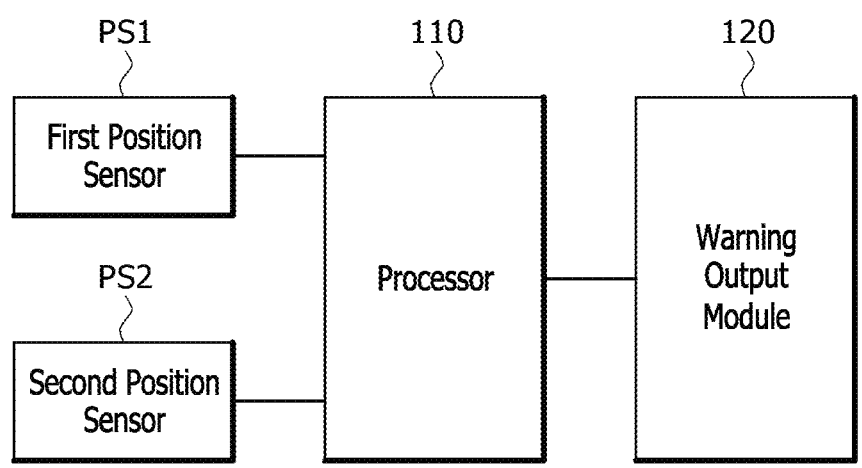
FIG. 2 is an illustrative view showing a schematic configuration of the apparatus for diagnosing malfunctions of steering angle sensors according to an embodiment of the present disclosure.

FIG. 2 is an illustrative view showing a schematic configuration of the apparatus for diagnosing malfunctions of steering angle sensors according to an embodiment of the present disclosure.

Referring to FIG. 2, the apparatus for diagnosing malfunctions of steering angle sensors includes position sensors PS1 and PS2 included in the steering angle sensor, a processor 110, and a warning output module 120.

As illustrated in FIG. 1, the steering angle sensor includes a main gear MG that is mounted on a steering shaft, first and second sub-gears SG1 and SG2 that are each meshed with the main gear MG at a specific gear ratio different from that of the main gear MG, and position sensors PS1 and PS2 that are respectively attached to the first and second sub-gears SG1 and SG2.

Outputs (i.e., signals) of the first and second position sensors PS1 and PS2 of the steering angle sensor are output to an electronic control unit (ECU) of the electric steering system. The first position sensor PS1 outputs a rotation angle of the first sub-gear SG1, and the second position sensor PS2 outputs a rotation angle of the second sub-gear SG2.

Accordingly, the position sensors PS1 and PS2 repetitively output an output signal of the same waveform whenever each of the sub-gears SG1 and SG2 is rotated once.

The first sub-gear SG1 and the second sub-gear SG2 are meshed with the main gear MG at different gear ratios.

The position sensors PS1 and PS2 can be implemented as rotary IC sensors or linear sensors using a magnet. Signals output from the steering angle sensor are output to the electronic control unit (ECU) of the electric steering system.

The processor 110 can control overall operations for determining the malfunctions of the steering angle sensors (i.e., the position sensors), and receive signals that are output from the position sensors PS1 and PS2 of the steering angle sensors as the corresponding sub-gear is rotated.

For example, as the steering wheel is rotated, the main gear MG mounted on the steering shaft is rotated. As the main gear MG is rotated, the two sub-gears SG1 and SG2 meshed with the main gear are rotated together.

Figure 5:
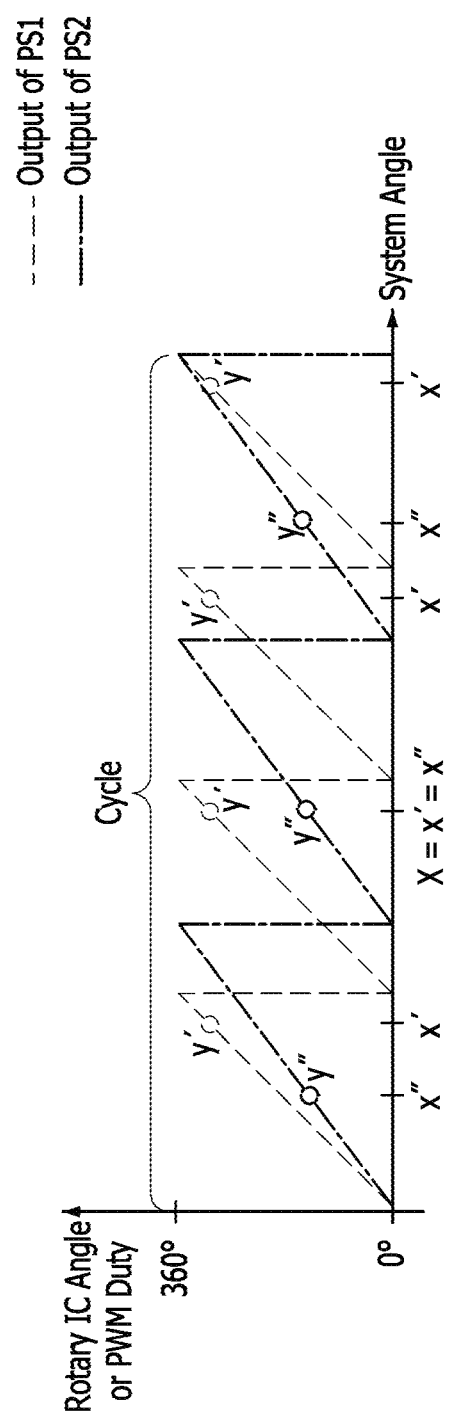
FIG. 5 is an illustrative view illustrating a method of diagnosing malfunctions of the position sensors using signals output from the position sensor in FIG. 4.

In this case, the processor 110 receives a signal (a PS1 signal) output from the first position sensor PS1 when the first sub-gear SG1 is rotated, and a signal (a PS2 signal) output from the second position sensor PS2 when the second sub-gear SG2 is rotated, determines consistency of the signals received from the position sensors PS1 and PS2 (e.g., whether or not system angle values (i.e., values to be output) of the PS1 signal and the PS2 signal are matched with preset values) to diagnose the malfunctions of the steering angle sensors (i.e., the position sensors) (see FIG. 5).

Further, when the malfunctions of the steering angle sensors (i.e., the position sensors) are diagnosed, the processor 110 outputs warning through the warning output module 120, or outputs an error code (a diagnostic trouble code (DTC)).

The warning output module 120 can output the warning using visual information or aural information.

Hereinafter, a method of diagnosing malfunctions of steering angle sensors will be described with reference to FIGS. 3 to 5.

Figure 3:
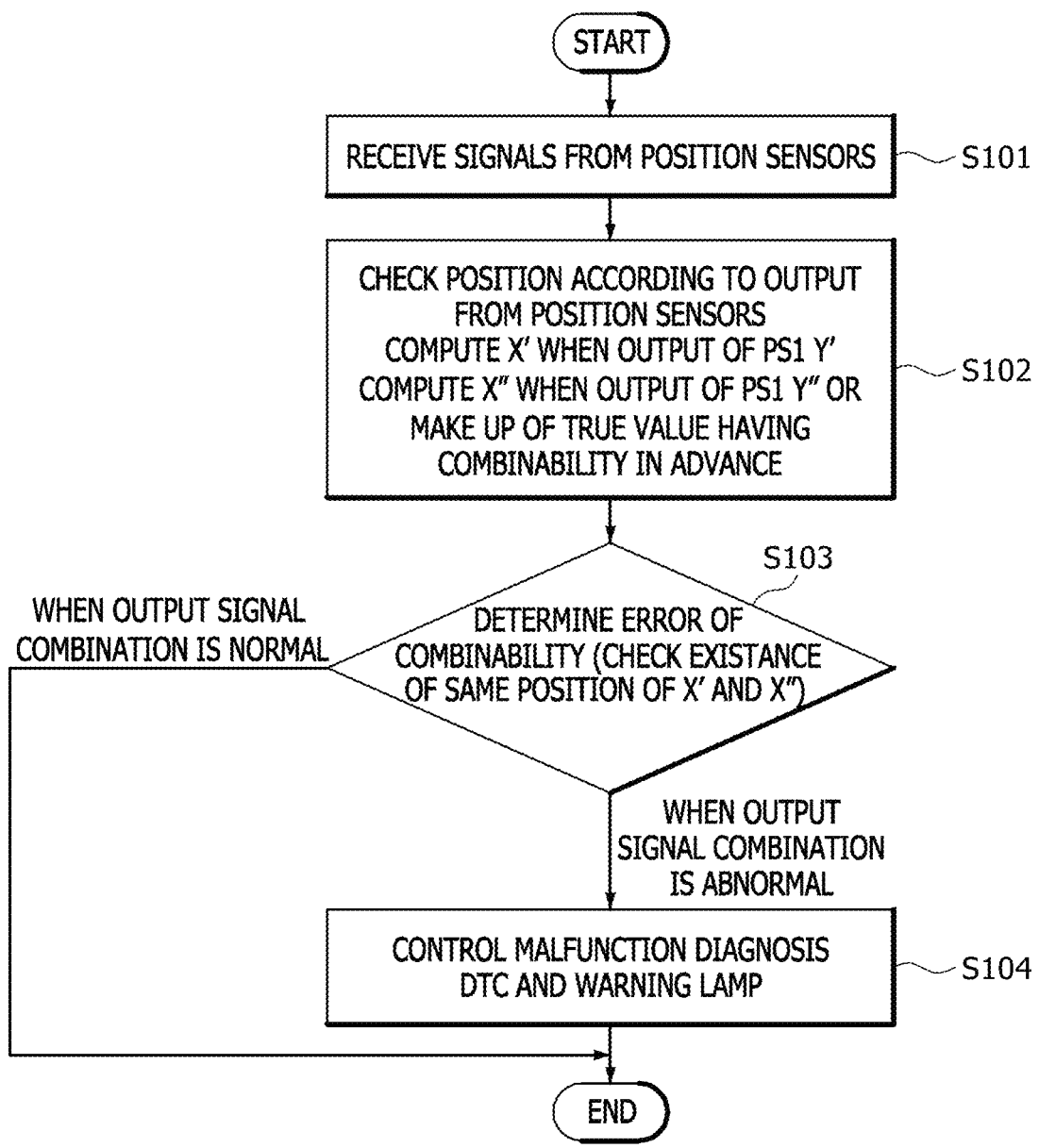
FIG. 3 is a flow chart illustrating a method of diagnosing malfunctions of steering angle sensors according to an embodiment of the present disclosure.

FIG. 3 is a flow chart illustrating a method of diagnosing malfunctions of steering angle sensors according to an embodiment of the present disclosure. FIG. 4 is an illustrative view showing signals output from position sensors that are respectively provided for two sub-gears in FIG. 1. FIG.

Figure 4:
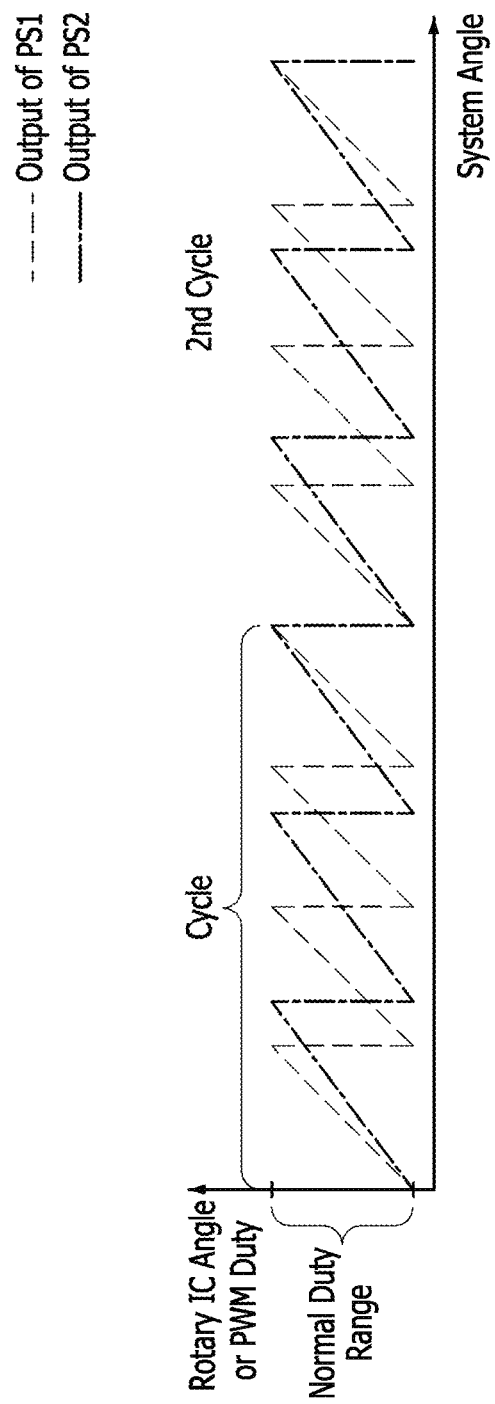
FIG. 4 is an illustrative view showing signals output from position sensors that are respectively provided for two sub-gears in FIG. 1.

5 is an illustrative view illustrating a method of diagnosing malfunctions of the position sensors using signals output from the position sensor in FIG. 4.

Referring to FIG. 3, the processor 110 receives signals output from the position sensors PS1 and PS2 (S101).

In this case, as illustrated in FIG. 4, because the gear ratios of the sub-gears SG1 and SG2 are different, the signals output from the position sensors PS1 and PS2 are configured such that signals having different frequencies (cycles) are output at one cycle of the system angle.

Referring to FIG. 4, the horizontal axis represents a system angle, and the vertical axis represents normal duty ranges of the sub-gears SG1 and SG2 (or the rotation angle of the sub-gears) in which a voltage or an angle (e.g., a rotary IC angle) may be used depending on sensor output means.

Thus, because a combination of the signals of the first and second position sensors PS1 and PS2 occurs at each cycle of the system angle, a combination of the system angles x' and x" calculated according to the output signal values y' and y" of the position sensors PS1 and PS2 is configured in a table (or a map) form, and may be pre-stored in an internal memory (not illustrated) (S102).

Accordingly, combinability (or matchability) of the signals of the position sensors PS1 and PS2 is determined at a specific system angle (S103). As a result, if an ungenerable abnormal combination of the signals of the position sensors PS1 and PS2 is detected at a specific system angle (in the event of output signal combination abnormality of S103), the processor 110 diagnoses (determines) the ungenerable abnormal combination to be the malfunction of the steering angle sensor (i.e., the position sensor), and controls the error code (DTC) and the warning output (or the output of a warning lamp) (S104).

Hereinafter, the method of diagnosing a malfunction of the aforementioned steering angle sensor will be described in greater detail with reference to FIG. 5.

Referring to FIG. 5, an absolute position X within the system angle can be seen through a combination of the output value of the PS1 signal and the output value of the PS2 signal. That is, the absolute position X within the system angle is computed through the values of y' and y" sensed from the position sensors PS1 and PS2 at the specific system angle.

For example, referring to FIG. 5, when a virtual horizontal line is drawn at any value of the longitudinal axis, an intersection y' at which the virtual horizontal line and the PS1 signal meet with each other, and the intersection y" at which the virtual horizontal line and the PS2 signal meet with each other are repeated four times and three times respectively, and the values x' and x" of the system angle corresponding to this are come out at the intersections y' and y" four times and three times, respectively.

If the position sensors PS1 and PS2 are normal (a first normal case), when the virtual vertical line is drawn at the intersection y' at which the virtual horizontal line and the PS1 signal intersect, a value x" of the system angle corresponding to the intersection y" at which the virtual vertical line and the PS2 signal meet with each other becomes the same value (X=x'=x") as the value x' of the system angle corresponding to the intersection y' at which the virtual vertical line and the PS1 signal meet with each other, the same waveform within the system angle of one cycle is repeated four times. For this reason, the intersection at which the value x' of the system angle is the same at the intersection y' at which the PS1 signal and the virtual horizontal line meet with each other (i.e., at the intersection y" at which the virtual vertical line and the PS2 signal meet with each other) is also detected four times.

Further, if the position sensors PS1 and PS2 are normal (a second normal case), when a virtual vertical line is drawn at the intersection y" at which the virtual horizontal line and the PS2 signal meet with each other, the value x' of the system angle corresponding to the intersection y' at which the virtual vertical line and the PS1 signal meet with each other become the same value (X=x'=x") as the value x" of the system angle corresponding to the intersection y" at which the virtual vertical line and the PS2 signal meet with each other, and the same waveform is repeated within the system angle of one cycle is repeated three times. For this reason, an intersection (i.e., the intersection y' at which the virtual vertical line and the PS1 signal meet with each other) equal to the value x" of the system angle at the intersection y" at which the PS2 signal and the virtual horizontal line meet with each other is detected three times.

Therefore, in correspondence with the two normal cases, values of the fourth same system angle and the third same system angle are not detected, it can be determined as a cause of a malfunction.

That is, when a virtual horizontal line is drawn at any value of the longitudinal axis representing normal duty ranges of the sub-gears SG1 and SG2 (or rotation angles of the sub-gears), and when a virtual horizontal line is drawn on the basis of the intersection y' at which the virtual horizontal line and the PS1 signal meet with each other, the same value (X=x'=x") is normally detected at all the intersection y' at which the virtual horizontal line and the PS1 signal meet with each other within an error range designated within which the value x" of the system angle corresponding to the intersection y" at which the virtual vertical line and the PS2 signal meet with each other and the value x' of the system angle corresponding to the intersection y' at which the virtual vertical line and the PS1 signal meet with each other, the position sensors PS1 and PS2 are normal.

However, when a virtual horizontal line is drawn on the basis of the value x' of the system angle at all the intersections y' at which the virtual horizontal line and the PS1 signal meet with each other and the intersection y' at which the virtual horizontal line and the PS1 signal meet with each other, it is determined that the position sensors PS1 and PS2 are not normal when the same value (X=x'=x") is not detected once within an error range within which the value x" of the system angle corresponding to the intersection y" at which the virtual vertical line and the PS2 signal meet with each other.

In this case, a combination of the system angles x' and x" calculated according to the position sensors PS1 and PS2 output signal values y' and y" is configured in a table (or map) form, and can be pre-stored in an internal memory (not illustrated).

Further, when the output signal values y' and y" of the position sensors PS1 and PS2 corresponding to the same specific system angles x' and x" are calculated using Math Formulas 1 and 2 below, and the output signal values y' and y" of the position sensors PS1 and PS2 in correspondence with the same two system angles x' and x" deviate from the designated error range, the position sensor can be determined as a cause of a malfunction.

First, an output signal value y' of the first position sensor PS1 at a specific system angle x' can be calculated using Formula 1 below.

$$x'=y'/a+b*i \qquad \text{[Formula 1]}$$

Referring to FIG. 5, four intersections (i.e., intersections when the horizontal line is drawn at the output signal value y' of the first position sensor PS1) can be detected within a range of a system angle of one cycle in correspondence with the same output signal value y' of the first position sensor PS1.

Here, a is referred to as the number of times of repetition which the same output signal value y' within the system angle can be detected, and can be calculated by the gear ratio of the first position sensor PS1 to the system angle.

For example, in FIG. 5, since the first sub-gear SG1 is rotated four turns within the system angle of one cycle, the gear ratio is 1:4, and that is, a=4.

b is a system angle interval (difference) at which the output value of the first position sensor PS1 is repeated in the same way, and can be calculated by "system angle/a". For example, since the system angle of one cycle is assumed to be 360 degrees in FIG. 5, b=360/4=90. Here, i is defined as a value of a constant smaller than a from zero (0) for the computation of the angle interval (difference), and becomes 0, 1, 2, or 3.

Therefore, if the output signal value y' of the first position sensor PS1 is known by Formula 1 above, the value of the system angle x' can be calculated (and thus, in FIG. 5, values of four system angles x' are calculated corresponding to the output signal value y' of the first position sensor PS1).

Further, the output signal value y" of the second position sensor PS2 at the specific system angle x" can be calculated using Formula 2.

$$x''=y''/c+d*j \qquad \text{[Formula 2]}$$

Here, values of c, d, and j are decided according to the second position sensor PS2, wherein c=the gear ratio (the number of repetitions of the second position sensor within a system angle), d=the system angle/c, and j is a value smaller than c from zero (0) and becomes 0, 1, or 2.

In conclusion, when the position sensors PS1 and PS2 are normal, when the output signal values y' and y" output from the position sensors PS1 and PS2 in correspondence with a value of the same system angle (x'=x") within the system angle of one cycle are normally repeated, the position sensors PS1 and PS2 are determined to be normal. When deviating from the designated error range without following a designated pattern, the position sensors PS1 and PS2 are determined to be abnormal.

As described above, the present embodiment is designed to be able to diagnose a malfunction of a position sensor included in a steering angle sensor detecting a steering angle of a steering wheel provided for a vehicle to which a steer-by-wire (SBW) system is applied. Further, the present embodiment has an effect capable of detecting position sensors outputting different output signal values y' and y" that are not designated corresponding to a value of the same system angle (x'=x") among two position sensors PS1 and PS2 included in a steering angle sensor. Further, the present embodiment can be used in all rotary ICs having different gear ratios.

Hereinabove, the present disclosure is described with reference to the embodiments illustrated in the drawings, but this is merely illustrative, and will be understood by those having ordinary knowledge in a field to which the art of interest belongs that various modifications and equivalent other embodiments are possible. Therefore, the technical protection scope of the present disclosure will be defined by the claims below. Further, implementation described in the present specification can be made by, for example, a method or a process, a device, a software program, a data stream, or a signal. Although the implementation is discussed only in the context of a single form (for example, discussed by the method only), the discussed features can also be implemented by another form (for example, a device or a program). The device can be implemented by suitable hardware, software, and firmware. The method can be implemented, for example, in a computer, a micro-processor, an integrated circuit, or a device such as a processor that generally refers to a processing device including a programmable logic device. Further, the processor includes a computer, a cell phone, and a communication device such as a portable/personal digital assistant (PDA) and another device.

What is claimed is:

1. An apparatus for diagnosing malfunction of a steering angle sensor, the apparatus comprising:
   a steering angle sensor comprising a main gear adapted to be mounted on a steering shaft, first and second sub-gears meshed with the main gear at a specific gear ratio different than a gear ratio of the main gear, and first and second position sensors attached to the first and second sub-gears respectively; and
   a processor configured to receive a signal output with rotation of the first and second sub-gears from each of the first and second position sensors, detect the position sensor of the first and second position sensors outputting different output signal values (y' and y") deviate from designated error ranges in correspondence with a value of a same system angle (x'=x"), and determining the detected position sensor as a cause of the malfunction;
   wherein the processor is configured to:
     when drawing a virtual horizontal line at any value of a longitudinal axis that represents normal duty ranges or rotation angles of the sub-gears, and when drawing a virtual vertical line based on an intersection at which the virtual horizontal line and the signal of the first position sensor meet,
     the value (x') of the system angle corresponding to the intersection at which the virtual vertical line and the signal of the second position sensor meet is the same value (x'=x") within a designated error range, and the first and second position sensors are determined to be normal when being normally detected at the intersections at which the virtual horizontal line and the signal of the first position sensor meet; and
     determine that at least one of the position sensors is not normal when the value of the system angle corresponding to the intersection is not detected as the same value (x'=x").

2. The malfunction diagnosing apparatus according to claim 1, wherein the processor is configured to receive an output signal from each of the first and second position sensors, compare the output signal values (y' and y") of the first and second position sensors with values pre-stored in a table or a map form in correspondence with the value of the same system angle (x'=x"), and determine the corresponding position sensor as the cause of the malfunction when an output signal value out of an error range is output.

3. The malfunction diagnosing apparatus according to claim 1, wherein the processor is configured to:
   when drawing a virtual horizontal line at any value of a longitudinal axis that represents normal duty ranges or rotation angles of the first and second sub-gears, and when drawing a virtual vertical line based on an intersection at which the virtual horizontal line and the signal of the second position sensor meet, the value (x') of the system angle corresponding to the intersection at which the virtual vertical line and the signal of the first position sensor and the value (x") of the system angle corresponding to the intersection at which the virtual vertical line and the signal of the first position sensor meet are the same value (x'=x") within a designated error range, and the first and second position sensors are determined to be normal when being normally detected at the intersections at which the virtual horizontal line and the signal of the second position sensor meet.

4. The malfunction diagnosing apparatus according to claim 2, wherein the processor is configured to
calculate the output signal values (y' and y") of the first and second position sensors corresponding to the same specific system angles (x' and x") using formulas 1 and 2, and
determine the position sensor as the cause of the malfunction when the output signal values (y' and y") of the first and second position sensors deviate from the designated error range corresponding to the values of the same two system angles (x' and x"):

$$x'=y'/a+b*i \qquad \text{[Formula 1]}$$

wherein "a" is a value calculated by the gear ratio of the first position sensor in relation to the system angle, as the number of times of repetition by which the same output signal value (y') is detected within the system angle,
"b" is a value calculated by dividing the system angle by a as a system angle interval at which the output value of the first position sensor is equally repeated, and
"i" is a value between zero and a constant less than a;

$$x''=y''/c+d*j \qquad \text{[Formula 2]}$$

wherein "c" is a value calculated by the gear ratio of the first position sensor in relation to the system angle, as the number of times of repetition by which the same output signal value (y') is detected within the system angle,
"d" is a value calculated by dividing the system angle by c as a system angle interval at which the output value of the first position sensor is equally repeated, and
"j" is a value between zero and a constant less than c.

5. A method of diagnosing malfunctions of steering angle sensors including a main gear mounted on a steering shaft, first and second sub-gears meshed with the main gear at a specific gear ratio different than a gear ratio of the main gear, and first and second position sensors attached to the first and second sub-gears, respectively, the method comprising:
receiving, by a processor, signals output from the position sensors while the sub-gears are rotated;
detecting, by the processor, one of the first and second position sensor, which outputs different output signal values (y' and y") that deviate from designated error ranges in correspondence with a value of a same system angle (x'=x"); and
determining the detected position sensor as a cause of the malfunction, wherein, to determine the malfunctions of the position sensors, the processor is configured to,
when drawing a virtual horizontal line at any one value of a longitudinal axis that represents normal duty ranges of the sub-gears or rotation angles of the sub-gears, and when drawing a virtual vertical line based on an intersection at which the virtual horizontal line and the signal of the first position sensor meet,
determine the position sensors to be normal when a value (x") of the system angle corresponding to an intersection at which the virtual vertical line and the signal of the second position sensor meet and a value (x') of the system angle corresponding to an intersection at which the virtual vertical line and the signal of the first position sensor meet are the same value (x'=x") within a designated error range, and when the virtual horizontal line and the signal of the first position sensor are detected normally at all intersections;
wherein, when the same value (x'=x") is not detected within a designated error range the value of the system angle corresponding to the intersection, the processor determines at least one of the position sensors to be abnormal.

6. The method of diagnosing malfunctions of steering angle sensors according to claim 5, wherein, after receiving output signals from the position sensors, the processor compares the output signal values (y' and y") of the position sensors with values pre-stored in a table or a map form in correspondence with the same system angle (x'=x"), and determines the detected position sensor as the cause of the malfunction when the output signal value out of an error range is output.

7. The method of diagnosing malfunctions of steering angle sensors according to claim 5, wherein, to determine the malfunctions of the position sensors, the processor is configured to,
when drawing a virtual horizontal line at any one value of a longitudinal axis representing normal duty ranges of the sub-gears or rotation angles of the sub-gears, and drawing a virtual vertical line based on an intersection at which the virtual horizontal line and the signal of the first position sensor meet,
determine the position sensors to be normal when a value (x') of the system angle corresponding to an intersection at which the virtual vertical line and the signal of the first position sensor meet and a value (x") of the system angle corresponding to an intersection at which the virtual vertical line and the signal of the second position sensor meet are the same value (x'=x") within a designated error range, and when the virtual horizontal line and the signal of the second position sensor are detected normally at all intersections.

8. The method of diagnosing malfunctions of steering angle sensors according to claim 6, wherein, to determine the malfunctions of the position sensors, the processor is configured to:
calculate output signal values (y' and y") of the position sensors that correspond to the same specific system angles (x' and x") using formulas 1 and 2, and
determine the position sensor as the cause of the malfunction when the output signal values (y' and y") of the position sensors deviate from the designated error range in correspondence with the values of the same system angles (x' and x")

$$x'=y'/a+b*i \qquad \text{[Formula 1]}$$

wherein "a" is a value calculated by the gear ratio of the first position sensor in relation to the system angle, as the number of times of repetition which the same output signal value (y') is detected within the system angle,
"b" is a value calculated by dividing the system angle by a as a system angle interval at which the output value of the first position sensor is equally repeated, and "i" is a value between zero and a constant less than a;

$$x''=y''/c+d*j \qquad \text{[Formula 2]}$$

wherein "c" is a value calculated by the gear ratio of the first position sensor in relation to the system angle, as the number of times of repetition by which the same output signal value (y') is detected within the system angle, "d" is a value calculated by dividing the system angle by c as a system angle interval at which the output value of the first position sensor is equally repeated, and "j" is a value between zero and a constant less than c.

\* \* \* \* \*